US007487584B1

(12) United States Patent
Lee

(10) Patent No.: US 7,487,584 B1
(45) Date of Patent: Feb. 10, 2009

(54) GUN TYPE CONTINUOUS CLIP EJECTING APPARATUS

(76) Inventor: Yong Woo Lee, Seocho Donga Tower - 1002, 1321-6 Seocho-dong, Seocho-gu, Seoul (KR)

( * ) Notice: Subject to any disclaimer, the term of this patent is extended or adjusted under 35 U.S.C. 154(b) by 0 days.

(21) Appl. No.: 12/044,265

(22) Filed: Mar. 7, 2008

(51) Int. Cl.
*B23Q 7/10* (2006.01)
*B23P 11/00* (2006.01)

(52) U.S. Cl. .................... 29/811.2; 29/814; 29/243.56; 29/270; 227/134

(58) Field of Classification Search ................ 29/811.2, 29/814, 225, 242, 243.56, 243.57, 243.58, 29/270, 284; 227/134
See application file for complete search history.

(56) References Cited

U.S. PATENT DOCUMENTS 3,235,950 A * 2/1966 Smotzer, Jr. ................ 221/276
3,793,696 A * 2/1974 Barr et al. ..................... 29/809
4,353,157 A * 10/1982 Sato ........................ 29/243.56
4,996,755 A * 3/1991 Sato ........................ 29/243.56
5,619,789 A * 4/1997 Chung ......................... 29/814
6,067,706 A * 5/2000 Sato ............................ 29/809
6,318,619 B1 * 11/2001 Lee ............................ 227/134
6,725,535 B2 * 4/2004 Edson et al. .................. 29/806
2004/0020023 A1 * 2/2004 Hsu ........................ 29/243.56

* cited by examiner

*Primary Examiner*—Jermie E Cozart
(74) *Attorney, Agent, or Firm*—DeLio & Peterson, LLC; Peter W. Peterson

(57) ABSTRACT

Disclosed is a gun type continuous clip ejecting apparatus. The gun type continuous clip ejecting apparatus includes a body including bodies symmetrically combined by each other with a curved shape and a clip guide groove therein; a cover inserted into the upper front end of the body; a slider installed slidably along a guide groove formed within the body; a clip loading push rod in which protrusions are formed at an end thereof and hooked to the hook of the slider, a hook is protruded upwardly at the other end thereof and protrusions are protruded at sides thereof; a tension spring in which an end thereof is hooked to the hook of the clip loading push rod and the other end thereof is pulled upwardly and fixed to the upper inside surface of the slider; a discharge push rod; a tension spring; and a trigger rotatably fixed to a bottom side of the body by a hinge shaft and including upper hooking protrusions contacted with a bottom end between both sides of the discharge push rod.

4 Claims, 5 Drawing Sheets

GUN TYPE CONTINUOUS CLIP EJECTING APPARATUS

BACKGROUND OF THE INVENTION

1. Field of the Invention

The present invention relates to a gun type continuous clip ejecting apparatus, and more particularly to a gun type continuous clip ejecting apparatus in which the clip ejecting apparatus is formed by a gun shape and clips are continuously ejected whenever a trigger of the apparatus is pulled, thereby being used conveniently and rapidly.

2. Description of the Related Art

Generally, a clip ejecting apparatus with a push or press manner have been used mainly in a conventional art. However, it is inconvenient to use. More specifically, when using the convention clip ejecting apparatus (herein-after, described as a dispenser), the dispenser is inclined toward the front thereof in order to reach clips to the front and thereafter a pressing rod of the dispenser is pushed forwardly by a thumb of a user contacted thereon, so that the clips are pushed forwardly. The above procedures must be performed repeatedly whenever the setting of documents is performed.

Accordingly, there are several disadvantages that a big force for pushing clips and a procedure for collecting clips toward the front are required.

SUMMARY OF THE INVENTION

Therefore, the present invention has been made in view of the above mentioned problems, and an object of the invention is to provide a gun type continuous clip ejecting apparatus in which the clips are smoothly ejected like a gun firing manner when ejecting the clips and then the document is bound, thereby increasing the user's convenience.

In accordance with one aspect, the present invention provides a gun type continuous clip ejecting apparatus including: a body including bodies symmetrically combined by each other with a curved shape and a clip guide groove therein; a cover inserted into the upper front end of the body and having a V-shape spring therein in order to make the clip eject when performing an ejecting operation of the clip; a slider installed slidably along a guide groove formed within the body and having a hook formed therein; a clip loading push rod in which protrusions are formed at an end thereof and hooked to the hook of the slider, a hook is protruded upwardly at the other end thereof and protrusions are protruded at sides thereof in order to be guided along the clip guide groove; a tension spring in which an end thereof is hooked to the hook of the clip loading push rod, contacted with the bottom of the clip loading push rod and the other end thereof is pulled upwardly and fixed to the upper inside surface of the slider; a discharge push rod in which a vertical surface is protruded upwardly and vertically at an end thereof, contacted with the rear of the clip in order to apply the pushing force, a hook is formed at the bottom of a spring moving path formed at the center thereof and guiding protrusions are formed at sides in order to be guided along a push rod guiding groove; a tension spring in which an end thereof is hooked in the hook of the discharge push rod and the other end thereof is pulled downwardly along the spring moving path of the discharge push rod and fixed to a side of a clip guide groove body of the body; and a trigger rotatably fixed to a bottom side of the body by a hinge shaft and including upper hooking protrusions contacted with a bottom end between both sides of the discharge push rod.

Preferably, a locking key is installed at the bottom of the body and has a locking protrusion combined with a bottom spring, and the locking protrusion is inserted into the bottom of the slider so that the slider is fixed.

More preferably, when moving the slider, the clip loading push rod is moved together, so that the plural clips are loaded in the clip guiding groove and the front end of the clip loading push rod pushes continuously and upwardly the end of the last clip among the loaded clips by the action of the tension spring.

More preferably, wherein when operating the trigger, the upper hooking protrusions of the trigger are contacted with the bottom end of the discharge push rod and then the discharge push rod is pushed and moved, so that the clip is discharged forwardly, the edges of the clip are widened and the documents are bound by the clip.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENT(S)

Now, the present invention will be described in detail with reference to the annexed drawings.

Figure 1:
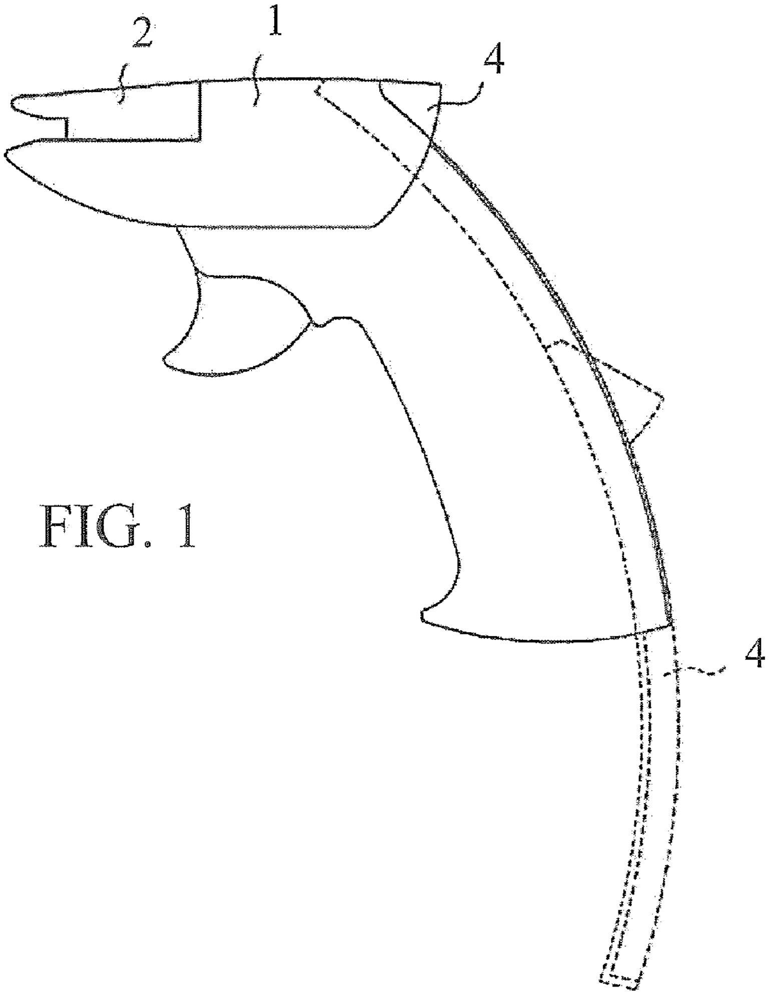
FIG. 1 is a side view schematically illustrating a construction of a gun type continuous clip ejecting apparatus according to an embodiment of the present invention.

FIG. 1 is a side view schematically illustrating a construction of a gun type continuous clip ejecting apparatus according to an embodiment of the present invention.

Figure 2:
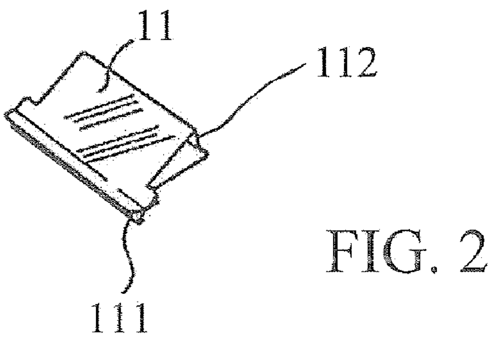
FIG. 2 is a perspective view schematically illustrating a clip embedded within a gun type continuous clip ejecting apparatus according to an embodiment of the present invention.

FIG. 2 is a perspective view schematically illustrating a clip embedded within a gun type continuous clip ejecting apparatus according to an embodiment of the present invention.

Figure 3:
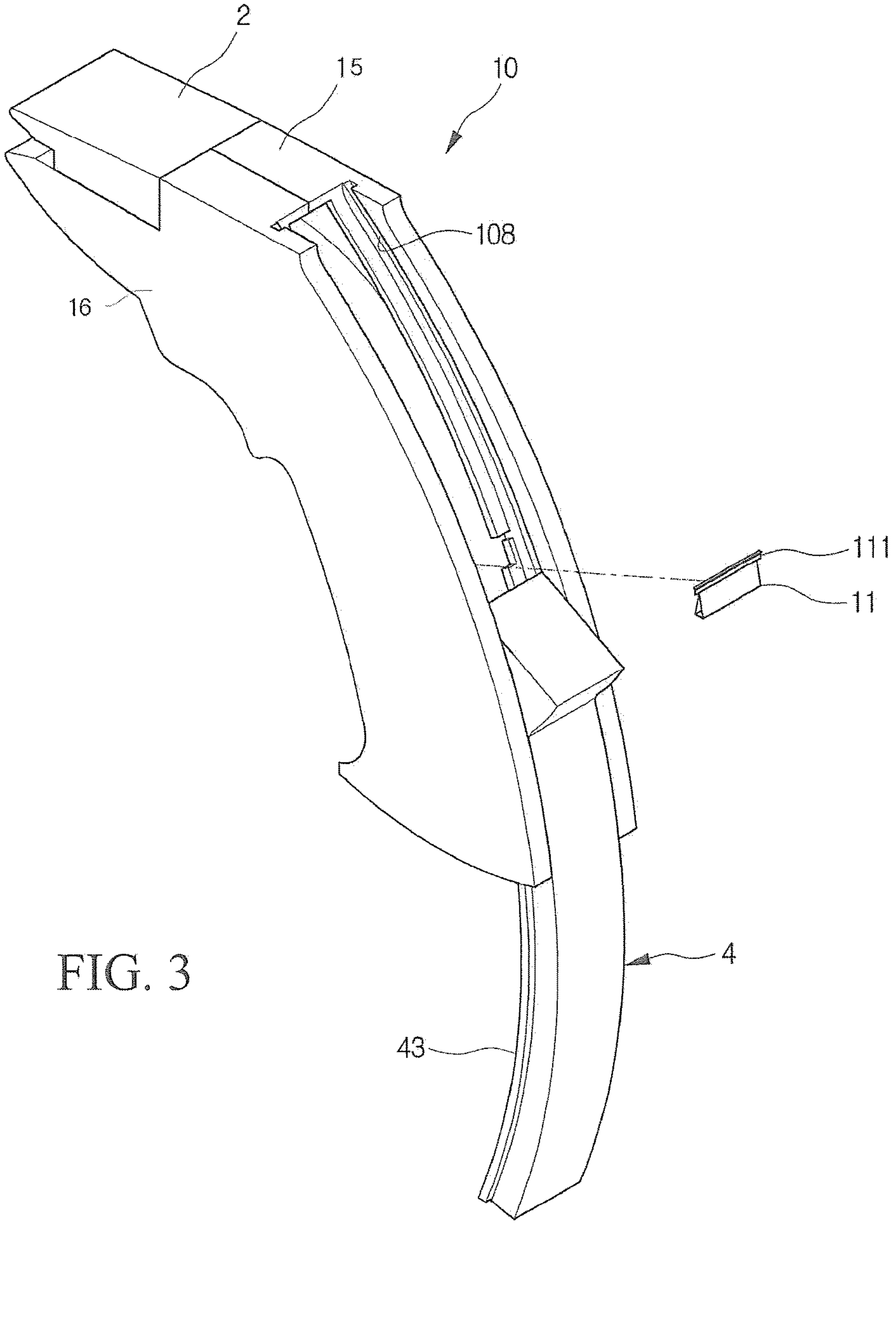
FIG. 3 is a perspective view schematically illustrating a gun type continuous clip ejecting apparatus according to an embodiment of the present invention.

FIG. 3 is a perspective view schematically illustrating a gun type continuous clip ejecting apparatus according to an embodiment of the present invention.

Figure 4:
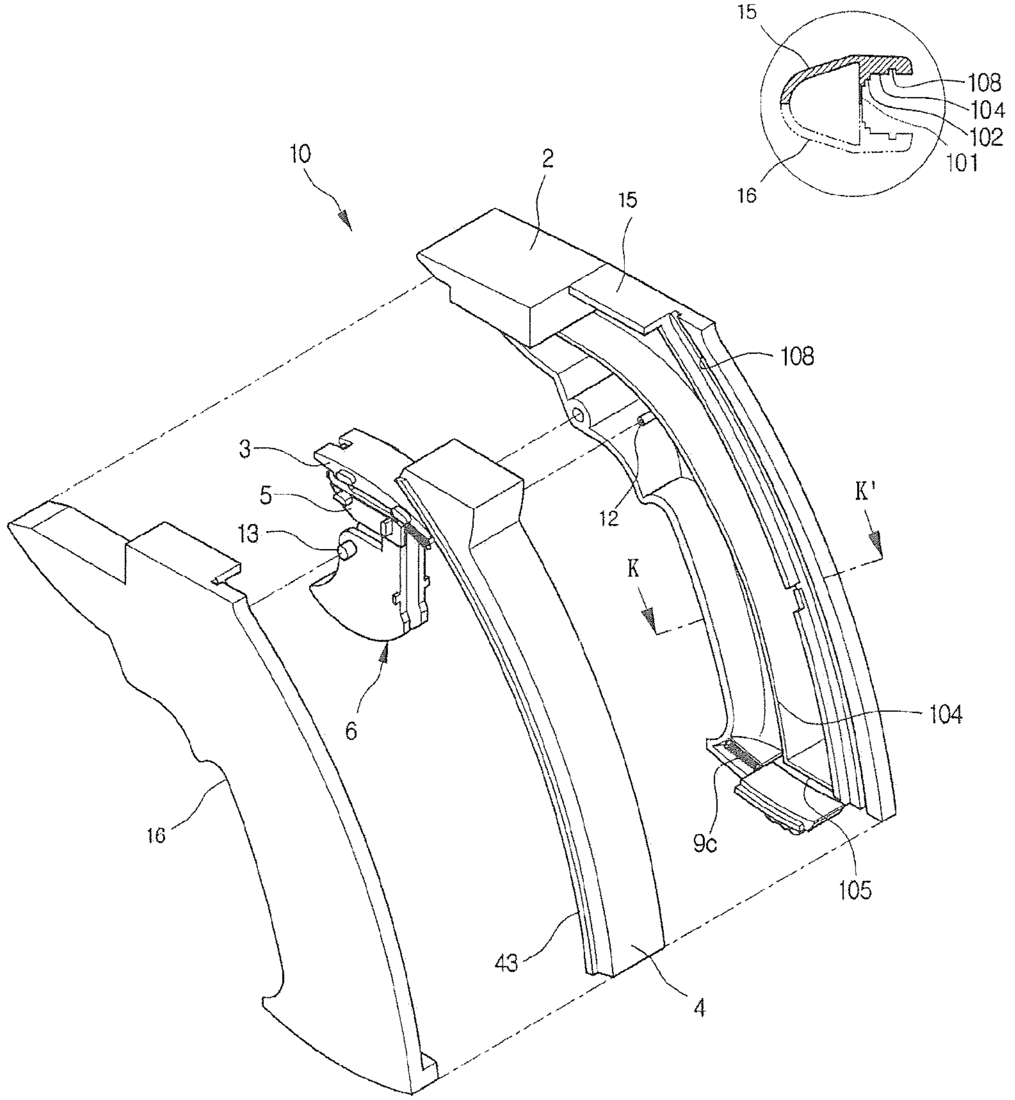
FIGS. 4 and 5 are partially exploded perspective views of FIG. 3.
Figure 5:
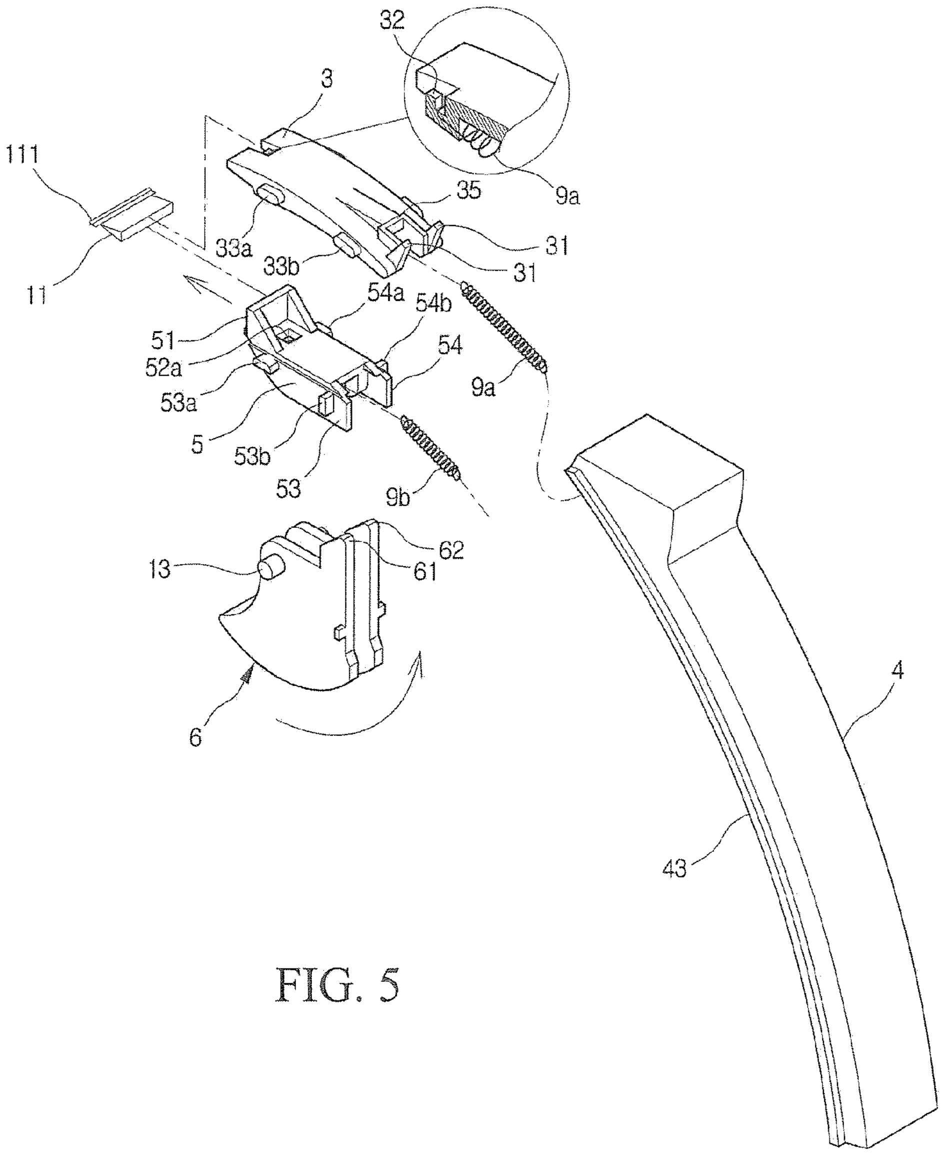
Figure 6:
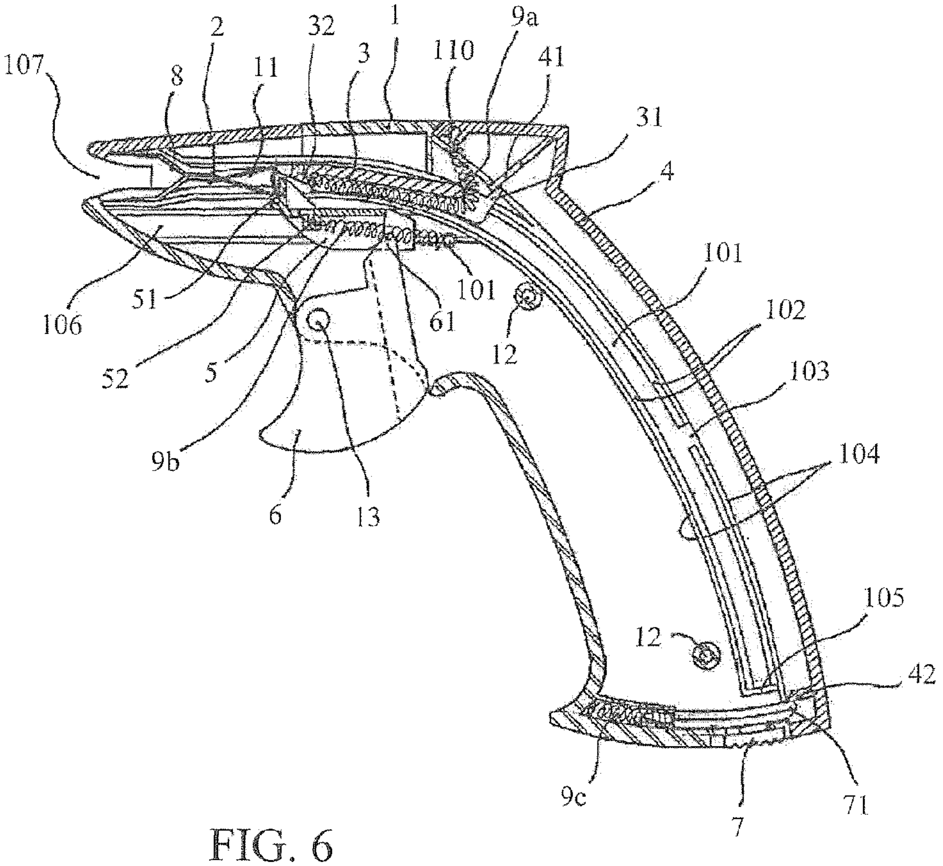
FIG. 6 is a side cross-sectional view of FIG. 1.

FIGS. 4 and 5 are partially exploded perspective views of FIG. 3, and FIG. 6 is a side cross-sectional view of FIG. 1.

As shown in FIGS. 1 to 6, a gun type continuous clip ejecting apparatus is to bind documents through clips 11 mounted therein.

The gun type continuous clip ejecting apparatus 10 comprises a body 1 including bodies 15 and 16 symmetrically combined by each other with a curved shape and a clip guide groove 102 therein, a cover 2 inserted into the upper front end of the body and having a V-shape spring 8 therein in order to make the clip 11 eject when performing an ejecting operation of the clip 11, a slider 4 installed slidably along a guide groove formed within the body 1 and having a hook 41 formed therein, a clip loading push rod 3 in which protrusions 31 are formed at an end thereof and hooked to the hook 41 of the slider 4, a hook 32 is protruded upwardly at the other end thereof and protrusions 33*a* and 33*b* are protruded at sides thereof in order to be guided along the clip guide groove 102, a tension spring 9*a* in which an end thereof is hooked to the hook 32 of the clip loading push rod 3, contacted with the bottom of the clip loading push rod and the other end thereof is pulled upwardly and fixed to the upper inside surface of the slider 4, a discharge push rod 5 in which a vertical surface 51 is protruded upwardly and vertically at an end thereof, contacted with the rear of the clip 11 in order to apply the pushing force, a hook 52 is formed at the bottom of a spring moving path formed at the center thereof and guiding protrusions 53*a*, 53*b*, 54*a*, 54*b* are formed at sides 53 and 54 in order to be guided along a push rod guiding groove 106, a tension spring 9*b* in which an end thereof is hooked in the hook 52 of the discharge push rod 5 and the other end thereof is pulled downwardly along the spring moving path of the discharge push rod and fixed to a side of a clip guide groove body 104 of the body 1, and a trigger 6 rotatably fixed to a bottom side of the body 1 by a hinge shaft 13 and including upper hooking protrusions 61 and 62 contacted with a bottom end between both sides of the discharge push rod 5.

A locking key 7 is installed at the bottom of the body 1 and has a locking protrusion 71 combined with a bottom spring 9*c*. The locking protrusion 71 is inserted into the bottom of the slider 4 so that the slider 4 is fixed.

A numerical reference number 12 denotes a protrusion member formed at a body 15 for construction of a body 1 and having a hole. A protrusion, although it is not shown, is formed at a position corresponding to the protrusion member 12 and inserted into the hole of the protrusion member when completing the body 1.

Hereinafter, only the body 15 (refers to FIG. 6) as a symmetrical body between bodies 15 and 16 for constructing the body 1 will be described and the detailed explanation of the body 16 will be omitted.

A numerical reference number 52*a* denotes an opening for showing a portion with the hook 52 at the discharge push rod.

A numerical reference number 43 denotes a guide member formed at both sides of the slider 4 and movably combined with the guide groove 108 formed within the body 1.

A numerical reference number 101 denotes a recess member formed along the center of a clip guide groove 102.

The discharge push rod 5 is guided by guiding protrusions 53*a*, 53*b*, 54*a*, 54*b* along the push rod guiding groove 106 so that it is not separated.

Also, the clip loading push rod 3 is guided by protrusions 33*a* and 33*b* along the clip guiding groove 102 so that it is not separated.

A numerical reference number 35 denotes the center portion of the other end of the clip loading push rod 3, which is contacted with an end of the tension spring 9*a* when an end of the tension spring 9*a* is hooked at the hook 32 formed at the bottom of the clip loading push rod 3 and pulled upwardly. The clip loading push rod 3 is fixed to the slider 4 and moved together when moving the slider 4.

On the other hand, a shape of the clip guiding groove 102 will be illustrated in detail in a partial cross-sectional view of K-K' of FIG. 4.

Now, the operation and effect of a gun type continuous clip ejecting apparatus according to an embodiment of the present invention will be described.

In the gun type continuous clip ejecting apparatus according to the present invention, the body 1 is constructed by two symmetrical bodies faced and combined with each other and construction components are embedded in the body. Clips 11 are loaded along a clip guiding groove 102 within the body, pushed and advanced toward a constant direction. The clip loading push rod 3 is placed at the clip guiding groove 102 and moved along the clip guiding groove 102. Protrusions 31 of the clip loading push rod 3 are downwardly hooked to the hook 41 of the slider 4. When the slider 4 is pulled downwardly toward the clip guiding groove body 104, the clip loading push rod 3 and the slider 4 are guided by the clip guiding groove 102 and moved downwardly together.

When the slider 4 is moved downwardly and maximally, the clip loading push rod 3 is moved to the end of a clip insertion hole 103 of the clip guiding groove 102, hooked at a stop portion 105 formed horizontally at the end portion of the clip insertion hole 103 of the clip guiding groove 102, so that the clip loading push rod 3 can not be moved any more and is stopped. Accordingly, since the slider 4 is hooked to protrusions 31 of the clip loading push rod 3, the slider 4 is also stopped. At this time, the clip insertion hole 103 is opened so that clips are inserted through the clip insertion hole and loaded. Several number of clips 11 are inserted and loaded and thereafter, the slider 4 is moved upwardly, the locking protrusion 41 of the slider 4 is contacted with the locking protrusion 71 of the locking key 7. At this time, the slant portions of locking protrusion 41 and the locking protrusion 71 are contacted with each other so that the locking protrusion 71 is pushed backwardly and slightly. When the slider 4 is completely closed at the body 1, the locking protrusion 71 of the locking key 7 is separated from the locking protrusion 41 of the slider 4 and then the locking protrusion 71 of the locking key 7 is pushed forwardly by a compression spring 9*c* and locked so that the slider 4 is fixed.

As described above, when the clips 11 are loaded, the loaded clips 11 are arranged toward a forward discharge opening 107 by the pulling force of the spring 9*a* in which an end thereof is fixed by a spring fixing screw 110 located at the upper end of the slider 4 and the other end thereof is hooked to a spring hook 32 formed at the front of the clip loading push rod 3.

When documents are inserted into the forward discharge opening 107 and the trigger 6 is pulled by a finger, the upper hooking protrusions 61 and 62 of the trigger 6 pushes the discharge push rod 5. The guiding protrusions 53*a*, 53*b*, 54*a*, 54*b* of the discharge push rod 5 are guided along the push rod guiding groove 106 so that the discharge push rod 5 is contacted at the rear 112 of the clip 11. At this time, a meeting point of both edges 111 of the pushed clip 11 is contacted with the rear of the V-shape spring 8, the pushed clip 11 is moved forward along the V-shape spring 8 and the edges 111 of the clip 11 are widened by the a V-shape of the V-shape spring 8 so that the documents are located between the edges of the clip 11, bound by the returning force of edges of the clip 11 and the bound documents are discharged. Since the operation of the V-shape spring is generally well known in the conventional art and the specific explanation will be omitted.

After completing the binding operation of documents, when a user puts down the trigger 6, the discharge push rod 5 is pulled by the spring 9*b* and returned at the original position, and the trigger 6 is also returned at the original position, the arranged clip 11 is advanced continuously by the clip loading push rod 3 and placed at the front of the discharge push rod 5 as a waiting state.

As described above, the document binding operation is performed as the repeat operation conveniently and rapidly.

According to the gun type continuous clip ejecting apparatus, loaded plural clips are continuously pushed by a spring toward the discharge hole and when a trigger is pulled, the clip is pushed by the discharge push rod inter-linked with the trigger so that the documents are bound.

As described above, according to the gun type continuous clip ejecting apparatus, there is an advantage that when a trigger is pulled with the weak force by a user like the firing of a gun, the clip is discharged so that the document or paper is bound.

That is, according to the present invention, the loaded plural clips are pushed always and continuously by a spring toward the discharge opening and when the trigger is pulled, the clips are pushed by the discharge push rod interlinked with the trigger so that the documents are bound.

According to the present invention, there is also an advantage that the clip loading push rod, the discharge push rod, the trigger and the slider for loading plural clips are integrally constructed so that the document binding operation is effectively, rapidly and conveniently performed.

Also, since the appearance of the apparatus is formed by a gun type, it arouses the user's interest and a user performs a work happily.

Also, according to the present invention, the document binding work is performed easily so that the productivity is increased.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A gun type continuous clip ejecting apparatus comprising:

a body including bodies symmetrically combined by each other with a curved shape and a clip guide groove therein;

a cover inserted into an upper front end of the body and having a V-shape spring therein in order to make a clip eject when performing an ejecting operation of the clip;

a slider installed slidably along a guide groove formed within the body and having a hook formed therein;

a clip loading push rod in which protrusions are formed at an end thereof and hooked to the hook of the slider, a hook is protruded upwardly at the other end thereof and protrusions are protruded at sides thereof in order to be guided along the clip guide groove;

a tension spring in which an end thereof is hooked to the hook of the clip loading push rod, contacted with the bottom of the clip loading push rod and the other end thereof is pulled upwardly and fixed to an upper inside surface of the slider;

a discharge push rod in which a vertical surface is protruded upwardly and vertically at an end thereof, contacted with the rear of the clip in order to apply the pushing force, a hook is formed at the bottom of a spring moving path formed at the center thereof and guiding protrusions are formed at sides in order to be guided along a push rod guiding groove;

a tension spring in which an end thereof is hooked in the hook of the discharge push rod and the other end thereof is pulled downwardly along the spring moving path of the discharge push rod and fixed to a side of a clip guide groove body of the body; and a trigger rotatably fixed to a bottom side of the body by a hinge shaft and including upper hooking protrusions contacted with a bottom end between both sides of the discharge push rod.

2. The gun type continuous clip ejecting apparatus according to claim 1, wherein a locking key is installed at the bottom of the body and has a locking protrusion combined with a bottom spring, and the locking protrusion is inserted into the bottom of the slider so that the slider is fixed.

3. The gun type continuous clip ejecting apparatus according to claim 1, wherein when moving the slider, the clip loading push rod is moved together, so that the plural clips are loaded in the clip guiding groove and the front end of the clip loading push rod pushes continuously and upwardly the end of the last clip among the loaded clips by the action of the tension spring.

4. The gun type continuous clip ejecting apparatus according to claim 1, wherein when operating the trigger, the upper hooking protrusions of the trigger are contacted with the bottom end of the discharge push rod and then the discharge push rod is pushed and moved, so that the clip is discharged forwardly, the edges of the clip are widened and the documents are bound by the clip.

* * * * *